United States Patent [19]

Punnett et al.

[11] 4,023,792
[45] May 17, 1977

[54] SHEET FEEDING APPARATUS

[75] Inventors: Frazer D. Punnett, Rochester; Charles H. Schmidt, Jr., Pittsford; Donald W. Tates, Fairport, all of N.Y.

[73] Assignee: Xerox Corporation, Stamford, Conn.

[22] Filed: Jan. 16, 1976

[21] Appl. No.: 649,777

Related U.S. Application Data

[63] Continuation of Ser. No. 205,911, Dec. 8, 1971.

[52] U.S. Cl. .................................. 271/22; 271/118; 271/127
[51] Int. Cl.² .......................................... B65H 3/30
[58] Field of Search .................. 271/21, 22, 24, 25, 271/39, 118, 126, 127

[56] References Cited

UNITED STATES PATENTS

| 2,012,105 | 8/1935 | Marchev | 271/22 X |
| 3,652,083 | 3/1972 | Bosshardt | 271/39 |

FOREIGN PATENTS OR APPLICATIONS

| 2,249 | 1/1912 | United Kingdom | 271/22 |

Primary Examiner—Richard A. Schacher
Attorney, Agent, or Firm—J. J. Ralabate; H. Fleischer

[57] ABSTRACT

A sheet feeding apparatus in which a stack of sheet material is moved from a non-feeding to a feeding position for advancing successive uppermost sheets therefrom along a substantially common path.

8 Claims, 7 Drawing Figures

SHEET FEEDING APPARATUS

This is a continuation of application Ser. No. 205,911, filed Dec. 8, 1971.

The foregoing abstract is neither intended to define the invention disclosed in the specification, nor is it intended to be limiting as to the scope of the invention in any way.

BACKGROUND OF THE INVENTION

This invention relates generally to an apparatus for advancing successive sheets from a stack of sheet material, and more particularly, to a reproducing machine having a sheet storage compartment containing a feeding mechanism for separating and advancing the uppermost sheet from the stack for further processing therein.

Reproducing machines which are designed to produce multiple copies in quick succession require suitable apparatus for insuring that a single sheet of material can be separated from a stack of such sheets and properly fed through the machine. One sheet after another is fed from the top of the stack of sheets and suitably processed within the reproducing machine.

A conventional sheet feeding apparatus is equipped with a tray member that supports the stack of sheets, separator elements mounted at the forward end of the tray member, and a feeding mechanism advancing successive separated sheets from the stack. Typically, the feeding mechanism must be continuously moved once in order to load the stack of sheets, and each time a successive sheet is to be advanced from the tray member, i.e., the feeding mechanism moves into and out of engagement with the successive sheets for advancement thereof. In a feeding mechanism having one or a plurality of rotatable feed rolls for advancing the paper, the relationship of the feed rolls with respect to the paper is extremely critical. Each sheet of paper should, preferably, engage the feed rolls at the same point of tangency. Only then will all of the sheets of paper be advanced from the tray member along substantially the same path, i.e., tangentially from the feed rolls at the point of contact therewith. The distance each successive sheet travels is minimized by the utilization of a common path. In particular, when a common path is utilized, the sheet feeding apparatus may be made more compact than was heretofore attainable with each successive sheet traversing different paths. The commonality of paths for each successive sheet reduces the required operating range of movement for the successive stages in the sheet feeding apparatus. This permits the mechanism associated with the successive stages of sheet feeding to be closely spaced from another and substantially reduced in size. It is, therefore, evident that the utilization of a common path along which successively separated uppermost sheets are advanced permits the size of the sheet feeding apparaus to be minimized. The aforementioned reduction in size of the sheet feeding apparatus is particularly useful in desk size reproducing machines.

Accordingly, it is a primary object of the present invention to improve the sheet feeding appratus by minimizing the distance of the path of travel for each successively separated uppermost sheet.

SUMMARY OF THE INVENTION

Briefly stated, and in accordance with the present invention, there is provided an apparatus and method of use thereof in which successively separated uppermost sheets are forwarded from a stack of such sheet material, along a substantially common path of travel.

In accordance with the present invention, the stack of sheet material is moved from a non-feeding position, in which the uppermost sheet of the stack is spaced from the feeding mechanism, to a feeding position in which the uppermost sheet engages the feeding mechanism. After the stack of sheets is moved into engagement with the feeding mechanism, the uppermost sheet is separated and advanced therefrom. Simultaneously therewith, the remainder of the stack is returned to its non-feeding position to permit the continued advancement of the sheet being fed and to enable to next successive uppermost sheet to be moved into engagement with the feeding mechanism. Each successively separated sheet is advanced from the stack along a substantially identical path to minimize the distance of travel thereof.

BRIEF DESCRIPTION OF THE DRAWINGS

Other objects and advantages of the present invention will become apparent upon reading the following detailed description and upon reference to the drawings, in which.

While the present invention will be described in connection with a preferred embodiment and associate method of use thereof, it will be understood that it is not intended to limit the invention to that embodiment and method of use. On the contrary, it is intended to cover all alternatives, modifications and equivalents as may be included within the spirit and scope of the invention as defined by the appended claims.

DETAILED DESCRIPTION OF THE INVENTION

Figure 1:
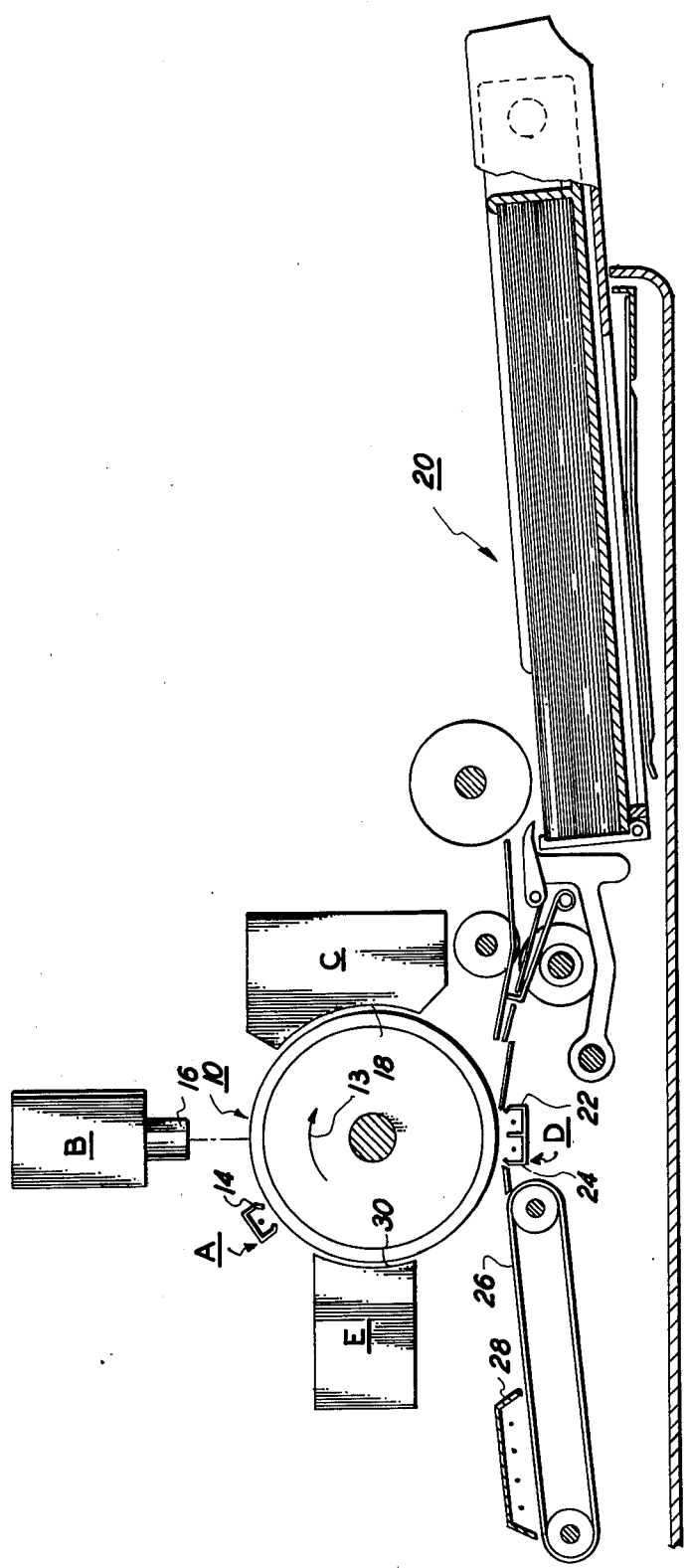
FIG. 1 illustrates schematically a preferred embodiment of a reproducing machine including a sheet feeding apparatus constructed in accordance with the present invention.
Figure 2:
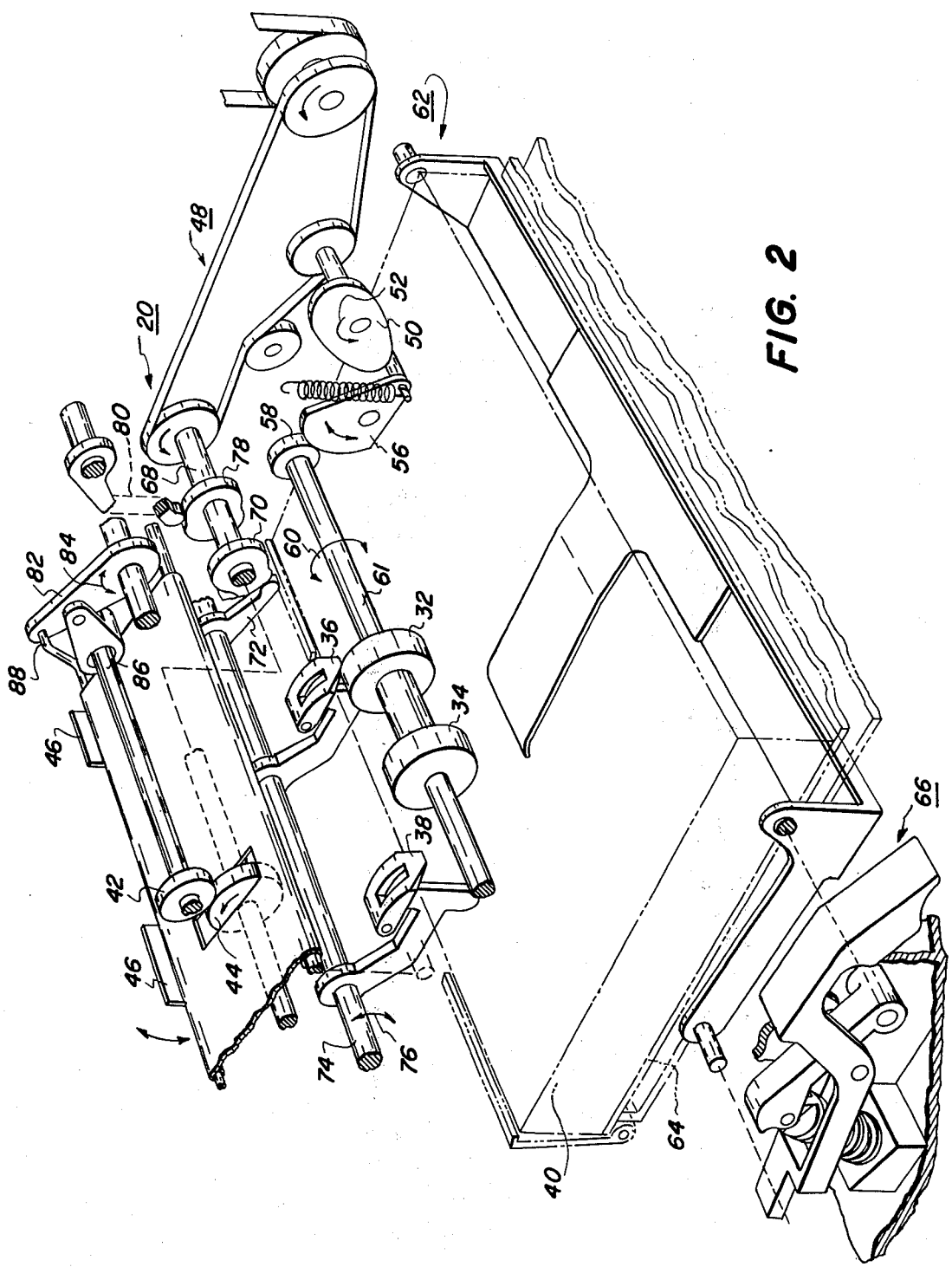
FIG. 2 is a perspective view of the sheet feeding apparatus of FIG. 1.
Figure 3:
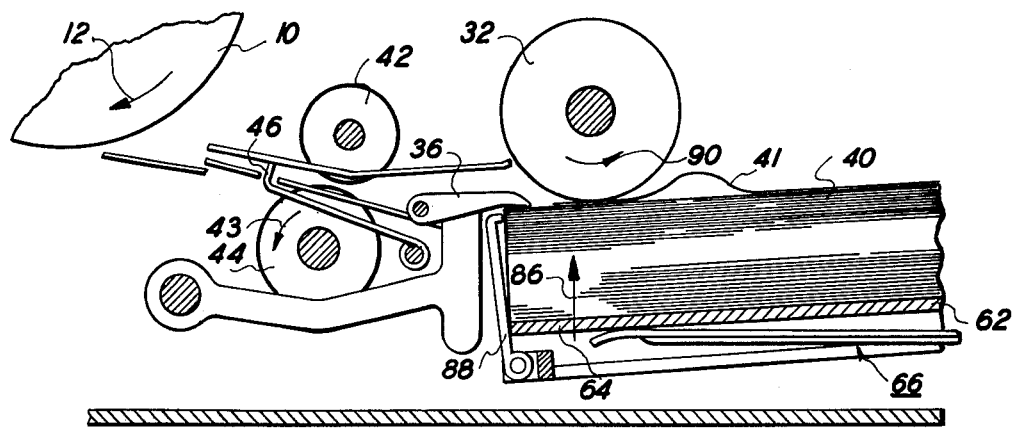
FIG. 3 is a fragmentary, enlarged elevational view of the sheet feeding apparatus buckling the uppermost sheet of the stack.
Figure 4:
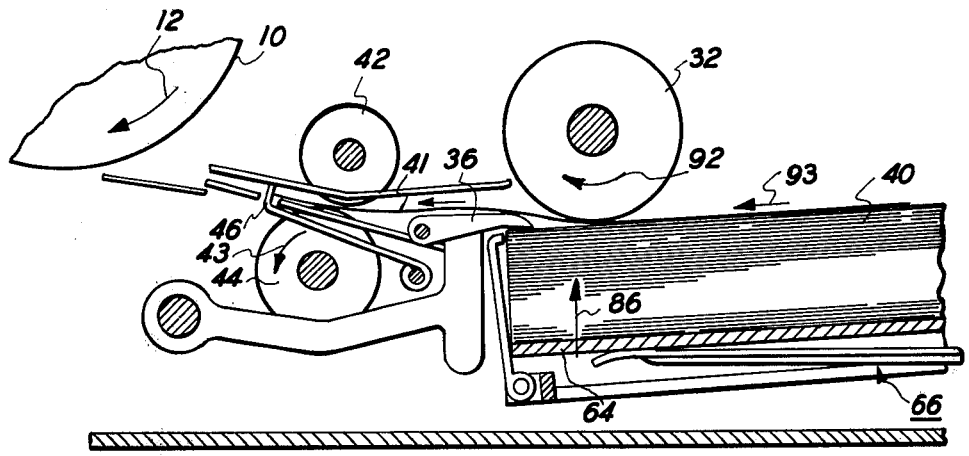
FIG. 4 is a fragmentary, enlarged elevational view of the sheet feeding apparatus advancing the uppermost sheet of the stack therefrom.
Figure 5:
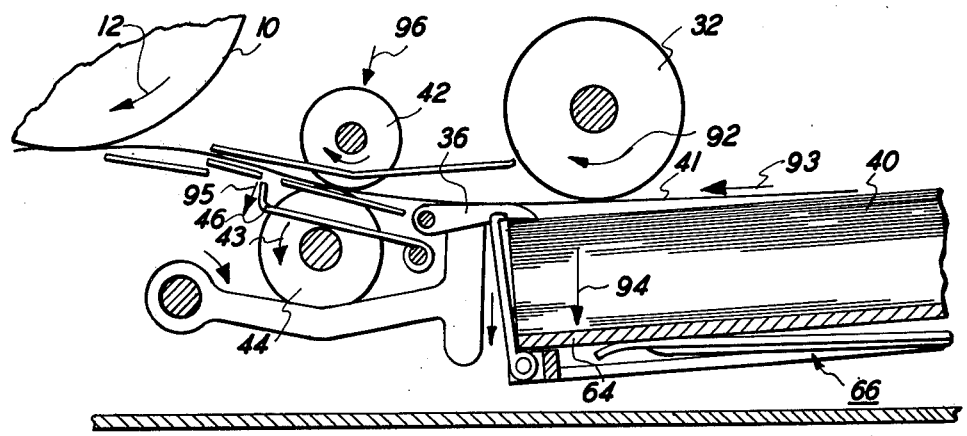
FIG. 5 is a fragmentary, enlarged elevational view of the sheet feeding apparatus with the stack disengaged from the feed rolls.
Figure 6:
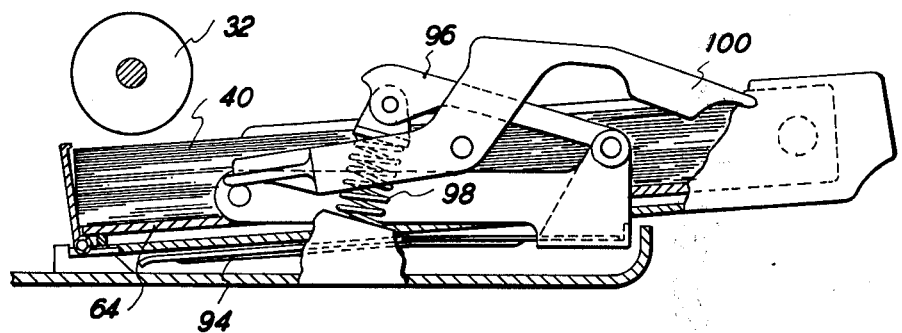
FIG. 6 is a fragmentary, enlarged elevational view of the stack being loaded into the sheet feeding apparatus.
Figure 7:
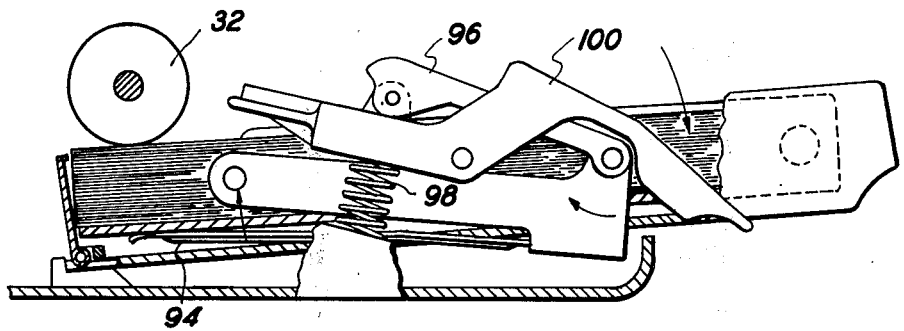
FIG. 7 is a fragmentary, enlarged elevational view of the stack being positioned in a feeding position on the sheet feeding apparatus.

Referring more particularly to the drawings, wherein like reference numerals have been used throughout to designate like elements, FIG. 1 illustrates schematically the operation of a sheet feeding apparatus in a conventional reproducing machine, such as a xerographic copier. FIG. 2 is a perspective view of the FIG. 1 sheet feeding apparatus showing the novel structure provided therein for separating and advancing successive uppermost sheets from the stack. FIGS. 3 through 5, inclusive, depict the successive steps of buckling the uppermost sheet, advancing the sheet, and returning the remainder of the stack to its initial non-feeding position. Finally, FIGS. 6 and 7 show the stack being loaded into the sheet feeding apparatus for advancement of the uppermost sheet therefrom. FIG. 1 will be discussed generally to provide the overall relationship of the sheet feeding apparatus with the reproducing apparatus, while FIG. 2 will be referred to in describing the construction of the sheet feeding apparatus. FIGS. 3 through 5, inclusive, will be discussed primarily when the method of separating and advancing successive sheets is described. FIGS. 6 and 7 will be referred to when describing the manner in which the stack is loaded into the sheet feeding apparatus.

As shown schematically in FIG. 1, the reproducing apparatus comprises an image bearing member including a photoconductive layer or light-receiving surface on a conductivebacking and formed in the shape of a drum, generally designated by numeral 10, which is mounted on a shaft journaled in a frame to rotate in the direction indicated by the arrow 12 to cause the drum surface sequentially to pass a plurality of processing stations.

For purposes of the present disclosure, the reproducing machine is a xerographic copier having several processing stations in the path of drum 10. Station A is a charging station having a corona charging device 14 for depositing a uniform electrostatic charge on the photoconductive layer of drum 10. Subsequent thereto, in the path of motion of drum 10, is an exposure station B. Exposure station B includes an optical scanning system 16, preferably of the type described in U.S. Pat. No. 3,062,094, issued to Mayo, projecting a light or radiation pattern of the copy to be reproduced onto the surface of drum 10. The light dissipates the drum charge in the exposed areas thereof and, thereby, records a latent electrostate image of the copy to be reproduced. Adjacent to exposure station B is developing station C having developer apparatus 18 therein. Developer apparatus 18 cascades developer material onto drum 10. The developer material includes toner particles having an electrostatic charge opposite to that of the electrostatic latent image over the surface of drum 10. As the developer material cascades over drum 10, toner particles adhere to the electrostatic image to form a powder image in the configuration of the copy to be reproduced. Positioned next and adjacent to developing station C is a transfer station D including a sheet feeding apparatus, generally indicated by the reference numeral 20, and a corona transfer device 22. Sheet feeding apparatus 20 feeds successive sheets to drum 10 in a timed relationship therewith to coincide with the presentation of a developed image on drum 10 at transfer station D. Corona transfer device 22 is located immediately after the point of contact between the advancing sheet and drum 10. The electrostatic field created by corona transfer device 22 is effective to attract the toner particles comprising the powder image from the surface of drum 10 and cause them to adhere electrostatically to the advancing sheet. Immediately subsequent to transfer station D is positioned a suitable corona detacking device 24 which neutralizes the electrostatic adhesion of the advancing sheet to drum 10 and separates the sheet therefrom. The sheet, thereafter, moves onto an endless conveyor 26 which carries it to a heat fuser 28 for permanently fixing the transferred powder image to the sheet. After fusing, the finished copy is discharged from the copier at a suitable point for collection externally thereof. The next and final station in the copier is a drum cleaning station E. Drum cleaning station E includes a drum cleaning device 30 which removes residual toner particles remaining on the surface of drum 10 after image transfer.

Referring now to the specific subject matter of the invention, the sheet feeding apparatus 20, positioned in the image transfer station D, for seriatim feeding of sheets, such as paper, into contact with drum 10 so that the developed powder images on the surface of drum 10 may be transferred to the paper, includes a tray member for holding a stack of sheet material, feed rolls for separating and advancing a single sheet from the stack, a registration member for aligning the advancing sheet, forwarding rolls for advancing the sheet after alignment, and suitable drive means for coordinating the timing of the advancement of successively separated sheets into contact with the drum for proper registration of the powder image on the drum onto the paper.

Turning now specifically to FIG. 2, sheet feeding apparatus 20 which advances successive sheets of paper to drum 10 in timed relation to the appearance of the developed image thereon includes preferably a pair of feed rolls 32 and 34, usually made of rubber or similar material mounted in cooperative relation to each other in front of tab members 36 and 38 which assist in separating the forwardly moving paper from the remainder of stack 40. However, it will be appreciated that one feed roll in lieu of two will operate satisfactorily. Feed rolls 32 and 34 advance the uppermost sheet of stack 40 over tab members 36 and 38 between forwarding rolls 42 and 44 until the leading edge portion of the advancing sheet engages registration member or gate 46. This is achieved by a suitable endless belt or chain drive 48 which rotates cam 50 in the direction of arrow 52. Sector gear 54 is resiliently maintained in engagement with cam 50 by means of a suitable spring member 56. Cam 50 drives sector gear 54 in an oscillating fashion. Sector gear 54 meshes with pinion gear 58 to rotate pinion gear 58 in counter clockwise and clockwise directions. Since pinion gear 58 and feed rolls 32 and 34 are secured to a common shaft 61, feed rolls 32 and 34 rotate in conjunction with pinion gear 58 as indicated by arrow 60. Feed rolls 32 and 34 are in intermittent rotation, and are adapted to engage the uppermost sheet of the stack disposed in the tray member, indicated generally at 62. Tray member 62 includes a pivotable base plate 64 on which the stack of sheet material 40 is disposed. The entire sheet feeding apparatus 20 is located within a suitable storage compartment within the reproducing machine. Biasing means, generally indicated at 66, is mounted in the storage compartment to engage base plate 64 to move it in an upwardly and downwardly direction. Base plate 64 is adapted to pivot so that the uppermost sheet of the stack 40 engages feed rolls 32 and 34 which are fixedly attached to the storage compartment via shaft 61 ad remain stationary relative thereto. Drive 48 rotates shaft 68 having cam 70 mounted thereon. Cam 70, in turn, drives cam follower 72 which is mounted on a common shaft 74 with tab members 36 and 38. Tab members 36 and 38, thereby, pivot in synchronism with feed rolls 32 and 34 to engage and disengage the uppermost sheet of stack 40 at the appropriate time, i.e., shaft 74 rotates in both a clockwise and counter clockwise direction as indicated by arrow 76. Preferably, tab members 36 and 38 are self aligning, i.e., they are suitably secured to shaft 74 to be vertically movable and laterally pivotable to position their horizontal surface squarely on the uppermost sheet of the stack. Registration roll 44 is mounted on shaft 69, which is driven by suitable drive system (not shown). Cam 78, mounted in shaft 68, drives cam follower 80, which, in turn, causes connecting line 82 to pivot in the direction of arrow 84. Link 82 has shaft 86 and rod 88 affixed thereto. In this way, shaft 86, which has forwarding roll 42 mounted thereon, is adapted to move forwarding roll 42 into and out of engagement with an advancing sheet passing over forwarding roll 44. The advancing sheet moves between the closely spaced forwarding rolls 42 and 44, and the leading edge portion thereof engages registration gate 46. Thereafter, link 82 pivots to move forwarding roll 42 downwardly into engagement with the advancing sheet, and registration gate 46 downwardly to disengage from the leading edge portion of the advancing sheet. The sheet is, thereupon, transferred to the image transfer station D in a timed relationship with the image on drum 10. It will be appreciated that the operation of the sheet feeding apparatus 20 is controlled by driving means 48, which, in turn, engages the copier input drive via a suitable clutch (not shown), actuated by a suitable solenoid (not shown) that is activated by the optical scanning system. In this manner, the sheet feeding apparatus is maintained in a timed relationship with the image on drum 10 to insure registration of the advancing sheet with the image.

Turning now to FIG. 3, base plate 64 has been moved in an upwardly direction, as indicated by arrow 86, by biasing means 66 to move the uppermost sheet 88 into engagement with the feed rolls 32 and 34. Gate member 88 of tray member 62 has pivoted counter clockwise when the cassette was loaded into the copier to disengage the lip thereof from the uppermost sheet of stack 61. Feed rolls 32 and 34 are rotating in a counter clockwise direction, as indicated by arrow 90, to move the uppermost sheet 41 of stack 40 in a rearwardly direction. The rearward movement of the sheet 41 produces a buckle therein and facilitates the separation thereof from the remainder of the sheets of stack 40. Furthermore, as shown in FIG. 3, forwarding rolls 42 and 44 are spaced apart from one another and registration gate 46 is pivoted in an upwardly direction to its closed position. Incidentally, it will be appreciated that forwarding roll 44 is continuously driving whether or not roll 42 is in engagement with a sheet. As sheet 41 moves rearwardly, it slips from beneath tab members 36 and 38. Tab members 36 and 38 drop down onto the next successive uppermost sheet of stack 40.

Turning now to FIG. 4, the direction of rotation of feed rolls 32 and 34 has now been reversed, as indicated by arrow 92. Sheet 41 is now advanced in the direction of arrow 93, over tab members 36 and 38 until the leading edge portion thereof engages registration gate 46. Forwarding rolls 42 and 44 are spaced apart from one another to permit sheet 41 to be interposed therebetween. The leading edge portion of advancing sheet 41 abuts registration gate 46 and a buckle is produced therein. The buckle produced by the engagement of the leading edge portion of sheet 41 with gate member 46 removes any sidewise skewing of sheet 41. This insures that the image transferred from drum 10 will be appropriately orientated on sheet 41. After the leading edge portion of sheet 41 has engaged gate member 46 and produced a slight buckle therein, gate member 46 is moved in a downwardly direction as registration roll 42 moves in a downwardly direction to contact and position sheet 41 in engagement with forwarding roll 44, rotating in the direction of arrow 43, for a continued advancement thereof.

Referring to FIG. 5, as forwarding roll 42 moves in a downwardly direction, as indicated by arrow 96, to move sheet 41 into engagement with registration roll 44, the tab members 36 and 38 pivot base plate 64 in a downwardly direction by applying a force of sufficient magnitude to overcome the resilient force exerted thereon by biasing means 66. Moreover, registration gate 46 is, simultaneously therewith, pivoted in a downwardly direction, as indicated by arrow 95, to permit sheet 41 to pass thereover into engagement with drum 10.

In this way feed rolls 32 and 34 only rotate about shaft 61 and do not translate relative to the storage compartment. Whereas the stack 40 disposed on base plate 64 is pivoted into and out of engagement with feed rolls 32 and 34. It will be noted that, in this fashion, successive uppermost sheets of the stack of sheet material engage feed rolls 32 and 34 at substantially the same circumferential point to be advanced tangentially therefrom along substantially a common path.

Turning now to FIGS. 6 and 7, it will be observed that loading arm 94, which is mounted pivotably at one end thereof to a suitable linkage 96 having a coiled spring 98 therein, is manualy depressed in substantially a downwardly direction to permit the stack of sheet material 40 to be loaded thereon without engaging feed rolls 32 and 34. When arm 100 of linkage 96 is released, loading arm 94 pivots in an upwardly, clockwise direction to pivot base plate 64 in an upwardly direction to a loaded position in which the uppermost sheet of stack 40 may engage feed rolls 32 and 34.

In order to insure that the advancing sheet will contact the drum in coincidence with the electrostatic image thereon, the distance between the center line of the drum and the registration gate is determined as a function of the speed of rotation of the drum, forwarding rolls, feed rolls and respective distances therebetween. By way of example, a drum having a diameter of 3.3 inches, rotating at a speed of 3.456 inches per second, will deliver about 20 copies per minute. Preferably, the registration rolls and the feed rolls rotate at substantially the same speed as the drum.

Hence, it is evident that this invention is adapted to achieve the various aims and objectives hereinbefore set forth. In recapitulation, the successively separated uppermost sheet is advanced from the stack along a substantially common path to minimize the distance of travel thereof.

Thus, it is apparent that there has been provided in accordance with the present invention, a sheet feeding apparatus and associate method of use thereof that fully satisfies the objects, aims and advantages set forth above. While the invention has been described, in conjunction with a specific embodiment and method of use, it is evident that many alternatives, modifications and variations will be apparent to those skilled in the art in light of the foregoing description. Accordingly, it is intended in the appended claims to embrace all such alternatives, modifications and variations as fall within the spirit and broad scope of this invention.

What is claimed is:

1. A method of forwarding, along a substantially common path of travel, successively separated sheets from a stack of sheet material, including the steps of:
   supporting a feed roll substantially fixedly;

moving the stack of sheet material from a non-feeding position, in which the uppermost sheet of the stack is spaced from the feed roll, to a feeding position, in which the uppermost sheet of the stack engages the feed roll;

rotating the feed roll in a first direction to move the uppermost sheet in a rearwardly direction forming a buckle therein to separate the sheet from the remainder of the stack;

rotating the feed roll in a second direction opposed from the first direction to move the uppermost sheet in a forwardly direction;

aligning the uppermost sheet after a portion thereof moves in a forwardly direction;

returning the remainder of the stack to the non-feed position; and advancing the uppermost sheet in the forward direction after said step of aligning and substantially simultaneously with said step of returning the remainder of the stack to the non-feed position, thereby minimizing the frictional drag exerted by the remainder of the stack on the uppermost sheet during the movement thereof in the forwardly direction.

2. A method as recited in claim 1 wherein said step of moving the stack from a non-feeding position includes the steps of:

supporting the stack of sheet material on a base plate in the non-feeding position; and urging resiliently the pivoting of the base plate in substantially an upwardly direction to move the stack of sheet material thereon to the feeding position in which the first mentioned uppermost sheet engages the feed roll.

3. A method as recited in claim 2, wherein said steps of aligning and advancing the uppermost sheet include the steps of:

interposing the advancing sheet between a pair of closely spaced forwarding rolls;

aligning the advancing sheet by engaging the leading edge portion thereof with a registration member;

removing the registration member from the path of travel of the advancing sheet; and moving, substantially simultaneously with said step of removing the registration member, the pair of forwarding rolls into engagement with the advancing sheet interposed therebetween.

4. A reproducing apparatus of the type having a storage compartment for holding a stack of sheet material therein and a moving image bearing member, wherein the improvement includes:

a frame member secured substantially fixedly to the storage compartment;

at least one feed roll mounted rotatably on said frame member;

means for moving the stack of sheet material from a non-feeding position, in which the uppermost sheet of the stack is spaced from said feed roll, to a feeding position, in which the uppermost sheet engages said feed roll; and means for rotating said feed roll in a first direction and a second direction, said feed roll being rotated in a first direction to move the uppermost sheet in a rearwardly direction forming a buckle therein to separate the uppermost sheet from the remainder of the stack and said feed roll rotating in the second direction to move the uppermost sheet in a forwardly direction;

means for aligning the uppermost sheet after a portion thereof means in a forwardly direction;

means for returning the remainder of the stack to the non-feed position; and means for advancing the uppermost sheet in the forward direction after the alignment thereof by said aligning means and substantially simultaneously with said returning means moving the remainder of the stack to the non-feed position, thereby minimizing the frictional drag exerted by the remainder of the stack on the uppermost sheet during the movement thereof in the forward direction.

5. An apparatus as recited in claim 4, wherein said moving means includes:

a base plate defining a generally planar surface supporting the stack of sheet material, said base plate being mounted pivotably in the storage compartment; and means for pivoting said base plate in substantially an upwardly direction to engage the uppermost sheet of the stack with said feed roll.

6. An apparatus as recited in claim 5, wherein said pivoting means includes biasing means for resiliently urging said base plate to pivot in substantially upwardly direction to engage the uppermost sheet of the stack with said feed roll.

7. An apparatus as recited in claim 6, wherein:

said aligning means includes a registration member aligning the sheet forwarded into engagement therewith by said feed rool, said registration member defining a generally vertical surface engaging the leading edge portion of the advancing sheet and cooperating with said base plate to move into and out of the path of each successive advancing sheet; and said advancing means includes a plurality of forwarding rollers cooperating with said registration member to move into engagement with the advancing sheet as said registration member moves out of the path of the advancing sheet.

8. An apparatus as recited in claim 7, further including a tab member defining a substantially horizontal surface engaging a portion of the uppermost sheet of the stack and a substantially vertical surface engaging the leading edge portion of the stack, said tab member being mounted laterally pivotably and vertically movably in the storage compartment.

* * * * *